(12) United States Patent
Mahajan et al.

(10) Patent No.: US 7,492,367 B2
(45) Date of Patent: Feb. 17, 2009

(54) APPARATUS, SYSTEM AND METHOD FOR INTERPRETING AND REPRODUCING PHYSICAL MOTION

(75) Inventors: Satyender Mahajan, Cambridge, MA (US); Zachery LaValley, Leominster, MA (US)

(73) Assignee: Motus Corporation, Cambridge, MA (US)

( * ) Notice: Subject to any disclaimer, the term of this patent is extended or adjusted under 35 U.S.C. 154(b) by 0 days.

(21) Appl. No.: 11/367,629

(22) Filed: Mar. 3, 2006

(65) Prior Publication Data
US 2006/0202997 A1    Sep. 14, 2006

Related U.S. Application Data

(60) Provisional application No. 60/660,261, filed on Mar. 10, 2005.

(51) Int. Cl.
G06T 15/70    (2006.01)

(52) U.S. Cl. .................. 345/473; 345/156; 345/158; 341/20; 455/456.1; 463/30; 473/131; 473/219

(58) Field of Classification Search .................. 345/473, 345/156, 158; 473/131, 219; 341/20; 455/456.1; 463/30
See application file for complete search history.

(56) References Cited

U.S. PATENT DOCUMENTS

| 3,792,863 A | 2/1974 | Evans |
| 3,806,131 A | 4/1974 | Evans |
| 4,839,838 A | 6/1989 | LaBiche et al. |
| 4,940,236 A | 7/1990 | Allen |
| 4,991,850 A | 2/1991 | Wilhlem |
| 5,067,717 A | 11/1991 | Harlan et al. |
| 5,233,544 A | 8/1993 | Kobayashi .................. 364/566 |
| 5,337,758 A | 8/1994 | Moore et al. |
| 5,472,205 A | 12/1995 | Bouton |
| 5,592,401 A | 1/1997 | Kramer |
| 5,598,187 A | 1/1997 | Ide et al. |
| 5,638,300 A | 6/1997 | Johnson |
| 5,694,340 A | 12/1997 | Kim .......................... 364/566 |
| 5,697,791 A | 12/1997 | Nashner et al. |
| 5,779,555 A | 7/1998 | Nomura et al. |
| 5,791,351 A | 8/1998 | Curchod ..................... 128/782 |

(Continued)

FOREIGN PATENT DOCUMENTS

WO    WO 02/35184 A2    2/2002

(Continued)

OTHER PUBLICATIONS

Verplaetse, C. "Inertial proprioceptive devices: Self-motion sensing toys and tools." *IBM Systems Journal*, vol. 35, Nos. 3 & 4, p. 639-650 (1996).

(Continued)

*Primary Examiner*—Kimbinh T Nguyen
(74) *Attorney, Agent, or Firm*—Choate Hall & Stewart LLP

(57) ABSTRACT

An apparatus, system and method for turning physical motion into an interpretable language which when formed into sentences reproduces the original motion. This system may be referred to herein as a "Motion Description System." Physical motion is defined as motion in one, two or three dimensions, with anywhere from 1 to 6 degrees of freedom. Language is defined as meaning applied to an abstraction.

21 Claims, 1 Drawing Sheet

U.S. PATENT DOCUMENTS

| | | | |
|---|---|---|---|
| 5,819,206 A | 10/1998 | Horton et al. | 702/150 |
| 5,826,578 A | 10/1998 | Curchod | 128/782 |
| 5,826,874 A | 10/1998 | Teitell et al. | |
| 5,875,257 A | 2/1999 | Marrin et al. | 382/107 |
| 5,898,421 A | 4/1999 | Quinn | 345/156 |
| 5,903,228 A | 5/1999 | Ohgaki et al. | 340/995 |
| 5,907,819 A | 5/1999 | Johnson | |
| 6,001,014 A | 12/1999 | Ogata et al. | 463/37 |
| 6,224,493 B1 | 5/2001 | Lee et al. | 473/223 |
| RE37,374 E | 9/2001 | Roston et al. | 318/561 |
| 6,441,745 B1 | 8/2002 | Gates | |
| 6,529,144 B1 | 3/2003 | Nilsen et al. | |
| 6,821,211 B2 | 11/2004 | Otten et al. | |
| 6,908,386 B2 | 6/2005 | Suzuki et al. | |
| 7,158,118 B2 | 1/2007 | Liberty | |
| 7,176,886 B2 | 2/2007 | Marvit et al. | |
| 7,236,156 B2 | 6/2007 | Liberty et al. | |
| 7,239,301 B2 | 7/2007 | Liberty et al. | |
| 7,262,760 B2 | 8/2007 | Liberty | |
| 7,263,462 B2 | 8/2007 | Funge et al. | |
| 2001/0024973 A1 | 9/2001 | Meredith | 463/36 |
| 2002/0077189 A1 | 6/2002 | Tuer et al. | 473/151 |
| 2002/0107085 A1 | 8/2002 | Lee et al. | 473/221 |
| 2002/0123386 A1 | 9/2002 | Perlmutter | 473/223 |
| 2003/0024311 A1 | 2/2003 | Perkins | 73/493 |
| 2005/0032582 A1 | 2/2005 | Mahajan et al. | 473/222 |
| 2005/0164678 A1* | 7/2005 | Rezvani et al. | 455/411 |
| 2005/0212753 A1 | 9/2005 | Marvit et al. | |
| 2006/0025229 A1 | 2/2006 | Mahajan et al. | 473/131 |
| 2006/0033711 A1 | 2/2006 | Kong | |
| 2006/0264260 A1 | 11/2006 | Zalewski et al. | |
| 2006/0287084 A1 | 12/2006 | Mao et al. | |
| 2006/0287086 A1 | 12/2006 | Zalewski et al. | |
| 2006/0287087 A1 | 12/2006 | Zalewski et al. | |
| 2007/0015558 A1 | 1/2007 | Zalewski et al. | |
| 2007/0015559 A1 | 1/2007 | Zalewski et al. | |
| 2007/0026869 A1 | 2/2007 | Dunko | |
| 2007/0050597 A1 | 3/2007 | Ikeda | |
| 2007/0052177 A1 | 3/2007 | Ikeda et al. | |
| 2007/0060228 A1 | 3/2007 | Akasaka et al. | |
| 2007/0060391 A1 | 3/2007 | Ikeda et al. | |
| 2007/0066394 A1 | 3/2007 | Ikeda et al. | |
| 2007/0072680 A1 | 3/2007 | Ikeda | |
| 2007/0178974 A1 | 8/2007 | Masuyama et al. | |

FOREIGN PATENT DOCUMENTS

| | | |
|---|---|---|
| WO | PCT/US02/20119 | 1/2003 |

OTHER PUBLICATIONS

Gorant, Jim. "Swing Doctors: A Computerized Motion Analysis System Helps BioVision Sports Perfect Your Golf Swing." *Popular Mechanics* (Oct. 1998).

PCT International Search Report for PCT/US03/40603, filed Dec. 19, 2003.

Non-Final Rejection, Jun. 1, 2007, U.S. Appl. No. 10/742,264.

Final Rejection, Mar. 19, 2008, U.S. Appl. No. 10/742,264.

Non-Final Rejection, Sep. 28, 2007, U.S. Appl. No. 11/133,048.

* cited by examiner

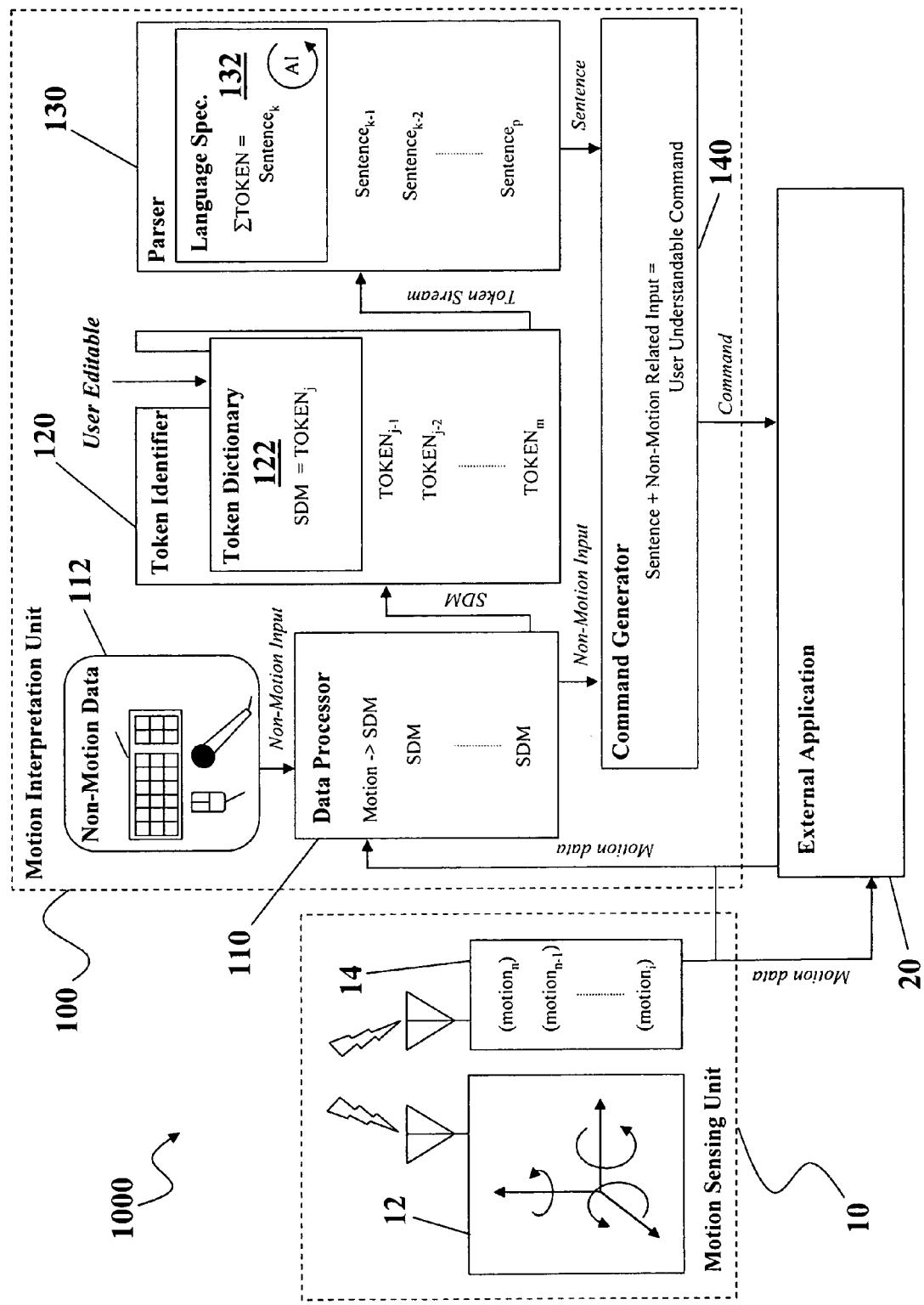

APPARATUS, SYSTEM AND METHOD FOR INTERPRETING AND REPRODUCING PHYSICAL MOTION

RELATED APPLICATIONS

The present application claims priority to U.S. Provisional Application No. 60/660,261, filed Mar. 10, 2005, entitled "System and Method for Interpreting and Reproducing Physical Motion," which is incorporated herein by reference.

FIELD OF THE INVENTION

The present invention is directed to the field of analyzing motion and more specifically to an apparatus, system and method for interpreting and reproducing physical motion.

BACKGROUND OF THE INVENTION

Motion sensing devices and systems, including utilization in virtual reality devices, are known in the art, see U.S. Pat. App. Pub. No. 2003/0024311 to Perkins, U.S. Pat. App. Pub. No. 2002/0123386 to Perlmutter, U.S. Pat. No. 5,819,206 to Horton, et al; U.S. Pat. No. 5,898,421 to Quinn; U.S. Pat. No. 5,694,340 to Kim; and U.S. Pat. No. RE37,374 to Roston, et al., which are all incorporated herein by reference.

Accordingly, there is a need for an apparatus, system and method that can facilitate the interpretation and reproduction of sensed physical motion.

SUMMARY OF THE INVENTION

An apparatus, system and method for turning physical motion into an interpretable language which when formed into sentences represents the original motion. This system may be referred to herein as a "Motion Description System." Physical motion is defined as motion in one, two or three dimensions, with anywhere from 1 to 6 degrees of freedom. Language is defined as meaning applied to an abstraction.

BRIEF DESCRIPTION OF THE DRAWING

The invention is described with reference to the FIGURE of the drawing, in which:

The FIGURE is a schematic illustration of a system used to turn physical motion into an interpretable language, according to various embodiments of the invention.

DETAILED DESCRIPTION OF VARIOUS EMBODIMENTS OF THE INVENTION

It is to be understood that both the foregoing general description and the following detailed description are exemplary and explanatory only and are not restrictive of the invention, as claimed. It may be noted that, as used in the specification and the appended claims, the singular forms "a", "an" and "the" include plural referents unless the context clearly dictates otherwise. References cited herein are hereby incorporated by reference in their entirety, except to the extent that they conflict with teachings explicitly set forth in this specification.

Referring now to the FIGURE of the drawing, the FIGURE constitutes a part of this specification and illustrates exemplary embodiments of the invention. It is to be understood that in some instances various aspects of the invention may be shown schematically or may be exaggerated to facilitate an understanding of the invention.

The FIGURE is a schematic illustration of a system 1000 used to turn physical motion into an interpretable language, according to various embodiments of the present invention. When formed into sentences the interpretable language may be used to abstractly replace the original physical motion. Embodiments of system components are described below.

Motion Sensing

In one embodiment, a motion sensing unit 10 is described as follows. Physical motion is captured using a motion capture device 12 such as, but not limited to, one or more of the following: accelerometer, gyroscope, RF tag, magnetic sensor, compass, global positioning unit, fiber-optic interferometers, piezo sensors, strain gauges, cameras, etc. Data is received from the motion capture device 12 and transferred to the motion interpretation unit 100, for example via a data reception and transmission device 14. As shown by the multiple embodiments illustrated, the motion data may then be transferred directly to the motion interpretation unit 100 or may be transferred via an external application 20, such as a program that utilizes the raw motion data as well as the commands received from the motion interpretation unit 100 (described below). Data transfer may be accomplished by direct electrical connection, by wireless data transmission or by other data transfer mechanisms as known to those of ordinary skill in the art.

Motion Interpretation

In one embodiment, a motion interpretation unit 100 contains the following components:

Data Processor 110

Raw motions are periodically sampled from the one or more physical motion capture devices 12 of the motion sensing unit 10.

Raw non-motion data is periodically sampled and input from a non-motion data device 112 (i.e. keyboard, voice, mouse, etc.).

A single sample of Complex Motion data is preliminarily processed. The Complex Motion data is defined as the combined sample of all raw physical motion captured by the motion capture device(s) and all non-motion data as defined above.

All the Single Degree Motion (SDM) components are identified from the Complex Motion data. The Single Degree Motion components are defined as the expression of a multi-dimensional motion in terms of single dimension vectors in a given reference frame.

Token Identifier (TI) or Tokenizer 120

The tokenizer 120 receives as input a stream of Single Degree Motion component samples.

Every time subsequent subset of samples is marked as a possible token.

A token dictionary 122 exists. The token dictionary is defined as a list of simple meanings given to SDM components. The token dictionary is editable.

Sample groups marked for tokenization are compared against the token dictionary 122 and are either discarded (as bad syntax) or given token status.

Parser 130

The parser 130 receives as input a stream of tokenized 3D Complex Motion/Non-Motion data.

Using a language specification 132, the tokens are grouped into sentences. In one embodiment, the system contains a default language specification.

Command Generator 140

The command generator 140 receives as input a sentence and outputs commands based on sentences and non-motion related inputs.

At any time a user may create or teach the system new language (i.e. tokens, sentences) by associating a raw motion with an output command. Output commands can include, but are not limited to, application context specific actions, keystrokes, mouse movements. In one embodiment, the output command is sent to the external application 20.

Languages may be context driven and created for any specific application.

In the one embodiment, for example golf, motions of the club may be interpreted too mean "good swing," "fade to the right," etc.

EXAMPLE APPLICATIONS

The Motion Description System is suitable for a number of applications:

Sports—Allowing a user to describe Complex Motion in terms of user-understandable language. For example: Golf. The system provides for the ability to allow a user to identify only an "in-to-out, open-faced, 43 mph" swing. Other sports could include, but are not limited to, Baseball, Football, Soccer, Hockey, Tennis, Racquetball, Squash, etc.

Sign Language to Spoken Language Translation—The Motion Description System can translate the signing motions into written or spoken language.

Military Signing—The Motion Description System can allow the military to translate silent communications via gestures, securely, to written or spoken language.

Musical Applications—The Motion Description System can allow time syncing a Conductor's baton to various metronomic devices via MIDI or other synchronization protocols.

3D Virtual Reality Control and Video Game Interaction—The Motion Description System allows for game developers to use human-understandable motion terms (e.g. "Run," "Jog," "Jab") during development. These terms can then be interpreted by the Motion Description System to generate and map appropriate motions to screen/world activity.

Computer Control—The Motion Description System can allow for computer users to control their environment through the use of simple gestures.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for processing captured multi-dimensional motion data, the method comprising:
   receiving, by a motion interpretation unit, motion data generated by at least one motion capture device, the motion data representative of captured multi-dimensional motion;
   processing, by the motion interpretation unit, the received motion data to form a stream of motion component samples;
   receiving, by a motion interpretation unit, non-motion data;
   processing, by the motion interpretation unit, the received non-motion data to form non-motion samples;
   tokenizing, by the motion interpretation unit, the motion component samples into one or more tokens, the tokens representative of captured motion; and
   generating, by the motion interpretation unit, one or more output commands, the one or more output commands derived from one or more processed tokens, non-motion samples, or a combination thereof.

2. A method according to claim 1, wherein the at least one motion capture device is a device selected from the group consisting of: an accelerometer, a gyroscope, an RF tag, a magnetic sensor, a compass, a global positioning unit, a fiber-optic interferometer, a piezo sensor, a strain gauge, a camera, and any combination thereof.

3. A method according to claim 1, wherein at least one motion capture device is adapted to be held and moved by a user and generate motion data in response to movements.

4. A method according to claim 1, wherein the step of receiving further comprises:
   receiving, by a data reception and transmission device, motion data generated by a motion capture device, the motion data representative of captured multi-dimensional motion; and
   transferring, by the data reception and transmission device, the received motion data to the motion interpretation unit.

5. A method according to claim 4, wherein the data reception and transmission device receives and transmits data wirelessly.

6. A method according to claim 1, wherein the at least one motion capture device transmits and receives data wirelessly.

7. A method according to claim 1, wherein the step of tokenizing further comprises:
   comparing, by the motion interpretation unit, the motion component samples against entries in an editable token dictionary, the token dictionary comprising data stored in memory; and
   marking, by the motion interpretation unit, a motion component sample as valid data tokens representative of captured motion based upon the comparison, or
   discarding, by the motion interpretation unit, a motion component sample based upon the comparison.

8. A method according to claim 1, wherein the one or more output commands are adapted to operate an application external to the motion interpretation unit.

9. A method according to claim 1, further comprising:
   processing, by the motion interpretation unit, the one or more tokens to form sentences, the sentences comprising groups of tokens.

10. A method according to claim 9, further comprising:
    combining, by the motion interpretation unit, one or more sentences with optionally one or more non-motion samples; and
    generating, by the motion interpretation unit, at least one output command associated with the combined one or more sentences and optional one or more non-motion samples, the output command adapted to operate an application external to the motion interpretation unit.

11. A system for processing captured multi-dimensional motion data, the system comprising:
    a motion interpretation unit for receiving non-motion data and motion data generated by at least one motion capture device, the motion data representative of captured multi-dimensional motion;
    a data processor for processing the received motion data to form a stream of motion component samples, and for processing the received non-motion data to form non-motion samples; and a tokenizer for tokenizing the motion component samples into one or more tokens, the tokens representative of captured motion, wherein the motion interpretation unit generates one or more output commands, the one or more output commands derived from one or more processed tokens, non-motion samples, or a combination thereof.

12. The system of claim 11, wherein the at least one motion capture device is a device selected from the group consisting of: an accelerometer, a gyroscope, an RF tag, a magnetic sensor, a compass, a global positioning unit, a fiber-optic interferometer, a piezo sensor, a strain gauge, a camera, and any combination thereof.

13. The system of claim 11, wherein at least one motion capture device is adapted to be held and moved by a user and generate motion data in response to movements.

14. The system of claim 11, further comprising:

a data reception and transmission device, the data reception and transmission device adapted to receive motion data generated by a motion capture device and transfer the received motion data to the motion interpretation unit.

15. The system of claim 14, wherein the data reception and transmission device receives and transmits data wirelessly.

16. The system of claim 11, wherein the at least one motion capture device transmits and receives data wirelessly.

17. The system of claim 11, further comprising:

an editable token dictionary, the dictionary comprising data stored in memory and having multiple entries representative of tokens, the dictionary providing a reference for comparing, by the motion interpretation unit, the motion component samples against the entries in the token dictionary.

18. The system of claim 11, further comprising:

a command generator wherein the command generator receives processed tokens representative of captured motion and generates output commands associated with the processed tokens.

19. The system of claim 18, wherein the output commands are adapted to operate an application external to the motion interpretation unit.

20. The system of claim 11, further comprising:

a parser, wherein the parser processes one or more tokens to form sentences, the sentences comprising groups of tokens.

21. The system of claim 20, further comprising:

a command generator, wherein the command generator combines one or more sentences with optionally one or more non-motion samples, and generates at least one output command associated with the combined one or more sentences and optional one or more non-motion samples, the output command adapted to operate an application external to the motion interpretation unit.

* * * * *